(12) United States Patent
Phillips (10) Patent No.: US 10,065,568 B2
(45) Date of Patent: Sep. 4, 2018

(54) BIKE CARRIER TRAY ASSEMBLY WITH AUTOMATIC TRAY POSITION LOCK

(71) Applicant: Cal M. Phillips, Platteville, WI (US)

(72) Inventor: Cal M. Phillips, Platteville, WI (US)

( * ) Notice: Subject to any disclaimer, the term of this patent is extended or adjusted under 35 U.S.C. 154(b) by 0 days.

(21) Appl. No.: 15/872,065

(22) Filed: Jan. 16, 2018

(65) Prior Publication Data

US 2018/0134230 A1    May 17, 2018

Related U.S. Application Data (62) Division of application No. 15/396,710, filed on Jan. 2, 2017, now Pat. No. 9,956,922.

(51) Int. Cl.
| B60R 9/10 | (2006.01) |
| B60R 9/06 | (2006.01) |
| B60R 9/04 | (2006.01) |

(52) U.S. Cl.
CPC ............ *B60R 9/10* (2013.01); *B60R 9/04* (2013.01); *B60R 9/06* (2013.01)

(58) Field of Classification Search
CPC ..... B60R 9/04; B60R 9/06; B60R 9/10; Y10S 224/924
See application file for complete search history.

(56) References Cited

U.S. PATENT DOCUMENTS

| 3,116,836 | A | 1/1964 | McCauley |
| 3,355,028 | A | 11/1967 | Mork |
| 3,529,737 | A | 9/1970 | Daugherty |
| 3,659,762 | A | 5/1972 | Kravitz |
| 3,843,001 | A | 10/1974 | Willis |
| 3,861,533 | A | 1/1975 | Radek |
| 4,171,822 | A | 10/1979 | Thun |
| 4,852,779 | A | 8/1989 | Berg |
| 4,875,608 | A | 10/1989 | Graber |
| 5,201,244 | A | 4/1993 | Stewart et al. |
| 5,423,566 | A | 6/1995 | Warrington et al. |
| 5,653,512 | A | 8/1997 | Phillips |
| 5,833,074 | A | 11/1998 | Phillips |
| 6,241,322 | B1 | 6/2001 | Phillips |
| 6,406,051 | B1 | 6/2002 | Phillips |
| 8,910,964 | B2 | 12/2014 | Bogolofski |
| 2007/0000962 | A1* | 1/2007 | Reeves ............... B60R 9/06 224/536 |
| 2015/0083770 | A1* | 3/2015 | Ziola ................... B60R 9/06 224/501 |

* cited by examiner

*Primary Examiner* — Corey Skurdal
(74) *Attorney, Agent, or Firm* — John V. Stewart (57) ABSTRACT

A bike carrier on a drawbar for a trailer hitch receiver has two trays for the wheels of a bike. The trays pivot between an operational lateral position and a compact forward position for shipping and storage. A tray lock bar mounted in the carrier is urged by a spring into a position that automatically releasably locks the trays in the operational position. Pivoting wheel retention arms on the trays have cross members that contact the bike tires and are adjustable along the retention arms for different wheel diameters. Each cross member is held against a tire by a retention arm pivot ratchet that is releasable to allow the retention arms to pivot outward to release the bike from the carrier.

5 Claims, 12 Drawing Sheets

BIKE CARRIER TRAY ASSEMBLY WITH AUTOMATIC TRAY POSITION LOCK

CROSS-REFERENCE TO RELATED APPLICATIONS

This is a divisional of U.S. patent application Ser. No. 15/396,710 filed Jan. 2, 2017, which is incorporated herein by reference in its entirety.

FIELD OF THE INVENTION

This invention relates to carriers for two-wheeled vehicles, and particularly to bicycle carriers for mounting on a motor vehicle roof rack or trailer hitch receiver.

BACKGROUND OF THE INVENTION

Racks for carrying bikes on motor vehicles often use hangers, clamps, straps, or cams to hold the bike in the rack. These require multiple operations to secure or release the bike. Hangers and clamps can mar the finish of a bike assembly during vibration of a traveling vehicle. Straps are subject to loosening, tearing, and deterioration.

Bike wheels should not be free to spin in the slipstream of a motor vehicle, and the steering wheel of the bike should not be free to turn. Otherwise, damage to the bike and/or the motor vehicle can result. Many racks do not inherently secure the wheels, relying on the competence and discretion of the user to do so with straps.

U.S. Pat. No. 4,875,608 (Graber) shows a folding bike carrier mounted on the rear of a vehicle. Each wheel is strapped to a tray, and the bike assembly is clamped to the carrier. This design secures the wheels, but the straps and clamps have the disadvantages described above.

U.S. Pat. No. 3,659,762 (Kravitz) shows a bike carrier with deep wells for holding a bike by its wheels. The bike must be strapped to the wells, since it is not clamped by them. Otherwise the bike could fly upward during a bump in the road. There is no adjustment for different sized bikes, so the wells are a loose fit, requiring straps to eliminate play of the bike within the wells.

Some bike carriers require removal of the front wheel, and bolting or clamping of the front dropouts to the carrier. This is inconvenient, even with a quick-release hub on the bike and/or a quick-release dropout clamp on the carrier. The front wheel must be strapped individually to the carrier or stowed elsewhere, possibly bending the rim or spokes, or scratching the carrier or vehicle.

The present inventor has commercial success with a bike carrier described in part in U.S. Pat. No. 5,833,074, filed May 6, 1995. Since this patent issued the inventor has improved the design, added a trailer hitch receiver embodiment, and is selling both roof rack and hitch receiver versions through his company, 1 up USA. The carrier described herein incorporates aspects from the above patent '074, plus intervening improvements that have been on sale for more than a year, and further improvements that have not been publicly disclosed. Intervening improvements applicable to both the roof rack and the hitch receiver versions include the following:

a) Wheel retention arms with two parallel side arms and a cross member, which, in combination, form an H-shape or inverted U-shape depending on the position of the cross member, which can be adjusted for different sized bike tires. Adjustment requires a wrench and is limited to a selection of alternate bolt holes on the parallel side arms. It is not infinitely adjustable.

b) The pivotal position of each wheel retention arm is controlled by a linear ratchet with shallow, symmetric ratchet teeth. The pawl can be over-rotated by the user in the release direction, causing drag on the pawl movement while opening the wheel retention arms.

A trailer hitch receiver version of the bike carrier with the following features has been on sale for over a year.

a) A main tray assembly with two aligned bicycle wheel trays to receive the front and back wheels of a bike. The main tray assembly is pivotally attached to a trailer hitch drawbar, allowing the assembly to pivot upward into a compact position behind a motor vehicle. The user must reach under the main tray assembly to reach the pivot release bar.

b) The two wheel trays pivot into a parallel position over the drawbar for compact shipping and storage without disassembly. The trays lock in the deployed position by respective levers, but the user must remember this. They do not automatically lock.

c) An add-on tray assembly can be bolted to the main tray assembly to carry a second bike or up to three bikes using two add-on assemblies. The user must reach under all tray assemblies to reach the tray assembly pivot release bar.

The present inventor also invented a quick-release drawbar mechanism as disclosed in U.S. Pat. No. 6,406,051 for use on his bike carrier. He later devised and sold a drawbar with a screw-operated internal rod that pushes a captive ball to extend from a side of the drawbar to lock it in the tubular hitch receiver.

SUMMARY OF THE INVENTION

Improvements herein that apply to both the roof rack and hitch receiver versions of the inventor's bike carrier include the following:

a) Infinite adjustability of the cross member position along the wheel retention arms without a wrench using a known bike wheel quick release mechanism to tighten and release the cross member anywhere along elongated slots in the side arms of the retention arms.

b) The pawl of the wheel retention arm ratchet has an over-rotation stop.

Improvements herein that apply to the inventor's hitch receiver embodiment of the bike carrier include:

a) The drawbar has a spring-loaded push button that extends into the hitch receiver pin hole to both retain the drawbar and set its insertion depth in the receiver. A translation screw moves a follower that pushes the front of the drawbar upward against the roof of the tubular hitch receiver. This combination provides redundant retention and proper insertion depth.

b) A lever on the head of the translation screw provides a constantly attached wrench and a hole for a security lock that enforces proper insertion direction the lock.

c) A trigger bar on the back end of the main tray assembly controls the pivot of the assembly so the user does not need to stoop or kneel to reach the pivot release bar.

d) The add-on assembly has an add-on trigger bar that quickly latches onto the trigger bar of the main tray assembly and provides a trigger at the back of the add-on assembly so the user does not need to kneel down and reach under two or three tray assemblies to reach the pivot release bar.

In combination the existing and new features on both the roof rack and hitch receiver versions of the present bike carrier provide:

(a) Retains the bike only by the tires. Does not scratch the bike frame;

(b) Quick infinite adjustment for bike wheels of different diameters without tools;

(c) Bike loads/unloads quickly using only one operation;

(d) No straps or other secondary retention needed;

(e) Locks the bike steering to prevent damage;

(f) Prevents the wheels from spinning in the vehicle slipstream.

In combination the existing and new features on the hitch receiver version of the present bike carrier provide:

(a) Mounts quickly and securely to a trailer hitch receiver on a motor vehicle;

(b) Add-on tray assembly for a second bike couples quickly to main tray assembly without tools;

(c) A main tray assembly for carrying a first bike and add-on tray assemblies for additional bikes, both assemblies have a pivot selection trigger at the back end of the assemblies;

(d) The two wheel trays for each bike quickly pivot between an aligned deployed configuration and a parallel compact shipping and storage configuration with automatic locking in the operational configuration.

BRIEF DESCRIPTION OF THE DRAWINGS

The invention is explained in the following description in view of the drawings that show.

GLOSSARY

"Bike" herein means a two-wheeled vehicle, including velocipede bicycles and motorcycles.

"Front" and "back" are oriented with a motor vehicle to which the bike carrier is attached. Thus, a "side view" of the roof rack carrier shows the side of a bike in the carrier, while a "back view" of the hitch receiver carrier shows the side of the bike.

"H-shaped or inverted U-shaped" herein includes a range of positions of the cross member on the wheel retention arms. If the cross member is at the top of the side members it becomes an inverted U-shape.

"Longitudinal" means parallel to the longest dimension of the subject component.

"Transverse" means perpendicular to the longest dimension of the subject component.

DETAILED DESCRIPTION OF THE INVENTION

The inventor has devised improvements to the "Fast-Loading Protective Bike Rack" described in U.S. Pat. No. 5,833,074. The improvements are beneficial individually and especially in combination, making the bike carrier easier to use, easier to manufacture, and lighter. Two main versions of the bike carrier are disclosed: a) a carrier for a car roof rack; and b) a carrier for a trailer hitch receiver.

Figure 1:
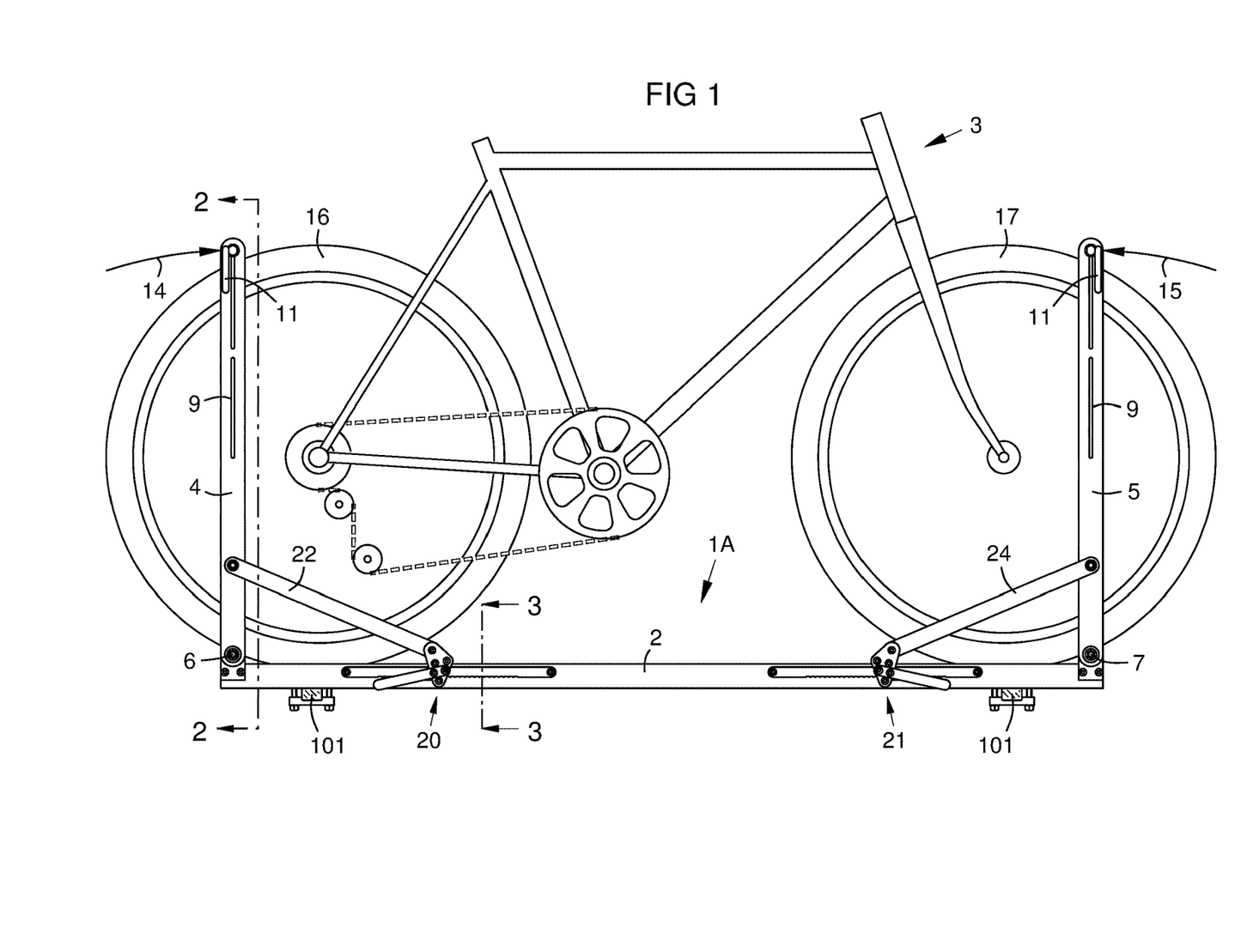
FIG. 1 is a side view of a bike carrier for a car roof rack according to aspects of the invention.

FIG. 1 is a side view of a bike carrier 1A mounted on a car roof rack 101. An elongated horizontal tray 2 receives the tires 16, 17 of a bike 3. The tray 2 may be a V-channel or U-channel extrusion that is concave upward. A wheel retention arm 4, 5 is attached pivotally 6, 7 near each end of the tray. The retention arms are H-shaped or inverted U-shaped as later shown. Each wheel retention arm may have elongated slots 9 to adjust the position of a cross member (later shown) for different wheel diameters via a quick-release cam lever 11. Each retention arm 4, 5 pivots inward 14, 15 until the cross member contacts the tire 16, 17 of the nearest wheel. The arm is locked against this tire by a ratchet mechanism 20, 21 acting through a stay 22, 24 connected between the pawl and the retention arm 4, 5. This causes the tires to be bracketed between the arms, securing the bike in all directions by its tires. The ratchet mechanism prevents outward pivoting of the wheel retention arms unless intentionally released. The retention arms pivot fully inward to the tray when the rack is not in use. Once adjusted and positioned for a given bike size, only one of the retention arms needs to be pivoted for insertion and removal of a bike of that size.

Each arm contacts the tire of the nearest wheel at a point above and outward from the wheel axle with respect to the bike, preferably for example about 45 degrees upward from hub level. This brackets and blocks the bike from moving, both along the tray and vertically. The bike is held firmly in place and cannot bounce upward or roll off the tray. The arms contact only the tires.

Figure 2:
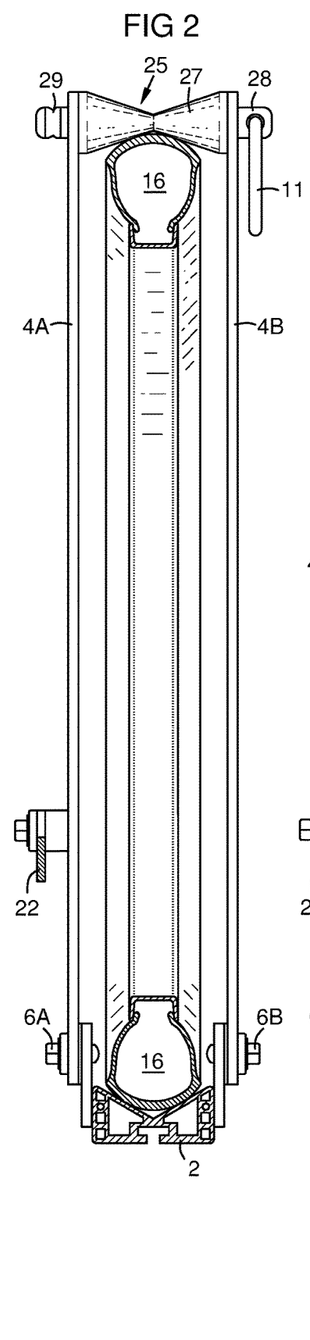
FIG. 2 is a sectional view along line 2-2 of FIG. 1, showing a bike tire retained by a wheel retention arm.

FIG. 2 is a sectional view taken along line 2-2 of FIG. 1, showing a tire 16 in the tray 2 and a wheel retention arm 4 contacting the tire with a cross member 25. The wheel retention arm has two side arms 4A, 4B attached by coaxial pivot points 6A, 6B to opposite sides of the tray 2. The cross member 25 is attached between the two side arms through the slots 9 (FIG. 1) in the side arms by means of a quick release cam lever 11 mechanism. This can be a conventional quick release device for attaching bicycle wheels to the forks of a bicycle. Preferably, the side arms 4A, 4B should have a spacing at or near a widest conventional bicycle dropout spacing so wide tires can be accommodated and an off-the-shelf wheel quick release device can be used. The cross member includes a retention arm separator 27, which may be formed in a bi-conic shape with a waist to receive a bike tire as shown.

Figures 3, 4:
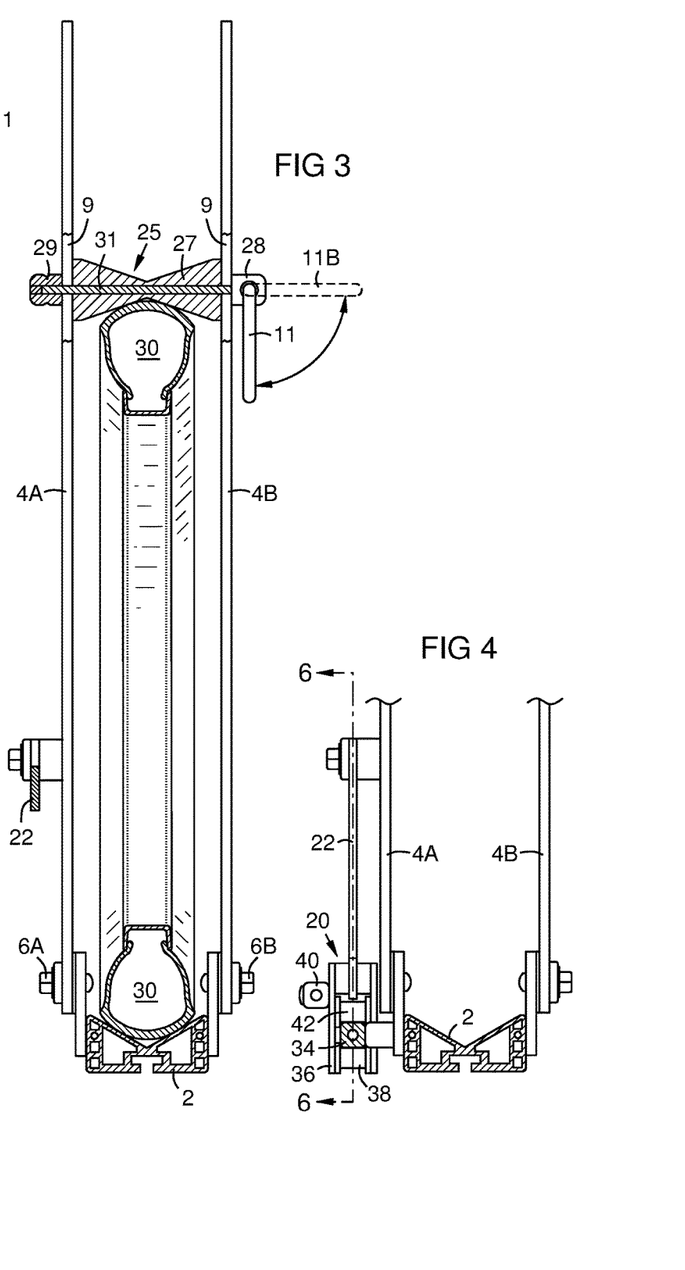
FIG. 3 is a view as in FIG. 2 showing the wheel retention arm adjusted for a smaller tire diameter.
FIG. 4 is a sectional view along line 3-3 of FIG. 1, showing aspects of the ratchet mechanism for the wheel retention arm.

FIG. 3 shows the same viewpoint as FIG. 2, with the cross member 25 moved downward for a smaller tire 30. The cam lever 11 is shown in an alternate loosened position 11B. The cross member 25 and side arms 4A, 4B form an H-shaped or inverted U-shaped configuration, depending on the position of the cross member. The quick-release mechanism is shown partly in section to show the shaft 31 or skewer passing through the separator 27. The shaft 31 passes through the slots 9 and the separator 27 from the cam 28 to a nut 29. Cam tension on the shaft is adjusted with the nut 29, then the nut does not need to be loosened again, and can remain at a setpoint, optionally with assistance from a thread locking compound or other means.

FIG. 4 is a sectional view taken along line 4-4 of FIG. 1, showing aspects of the ratchet mechanism 20, more fully shown later. A linear ratchet bar 34 has a pawl assembly 36 that holds a finger 38 against the bottom side of the ratchet bar. A pawl release lever 40 releases the finger from the ratchet bar. An over-rotation stop 42 prevents over-rotating the pawl assembly in the release direction as later described.

Figure 5:
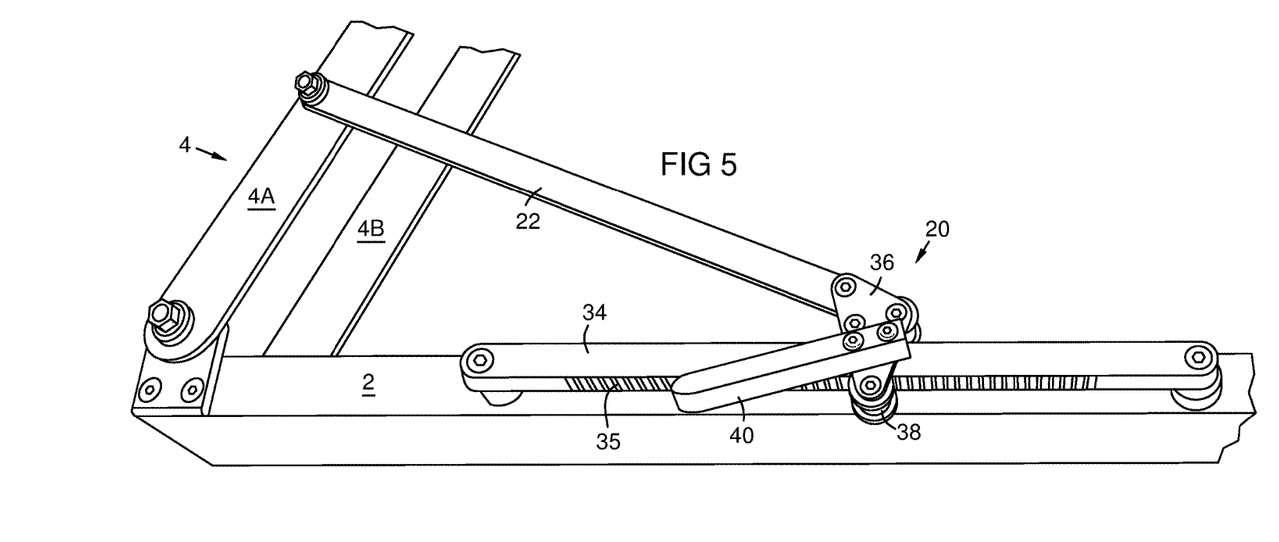
FIG. 5 is a perspective view of the wheel retention arm ratchet mechanism.

FIG. 5 is a perspective view of the linear ratchet mechanism 20 that holds the wheel retention arm 4 tight against a tire. The wheel retention arm has two parallel side arms 4A, 4B attached to respective opposite sides of the tray 2 at an end of the tray as shown. The wheel retention arm 4 is held against the tire by a stay 22 between the retention arm and the pawl frame 36 of the ratchet mechanism 20. A linear ratchet bar 34 has a bottom side with teeth 35. Upward force on a release arm 40 releases the pawl, allowing the retention arm 4 to be pivoted outward to mount or dismount a bike in the tray.

Figure 6:
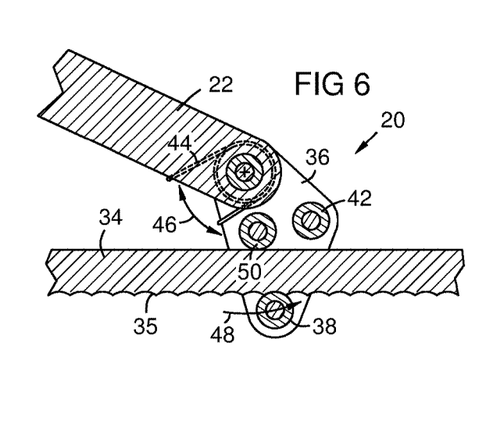
FIG. 6 is a sectional view taken along a line 6-6 of FIG. 4 with pawl locked.

FIG. 6 is a sectional view of the ratchet mechanism 20 taken on line 6-6 of FIG. 4. A torsion spring 44 urges the pawl frame 36 in a direction 48 that moves the pawl finger 38 against the teeth 35. Tension on the stay 22 is caused by the cross member of the retention arm 4 being jammed against the bike tire. This tension jams the finger 38 against the teeth due to a follower 50 on the top side of the ratchet bar acting as a fulcrum. Any force that tries to pivot the retention arm outward locks the pawl on the ratchet harder.

Figure 7:
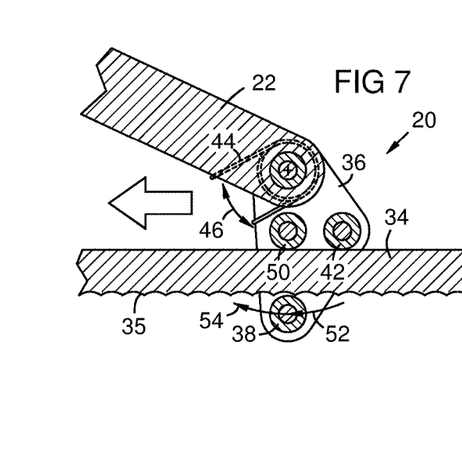
FIG. 7 is a view as in FIG. 6 with pawl released.

FIG. 7 is a sectional view of the ratchet mechanism as in FIG. 4, but in the release position. Upward manual force on the pawl lever 40 (FIG. 5) opposes and overrides the force 46 of the torsion spring 44, and pivots 52 the pawl frame 36 to move the finger 38 away from the teeth 35. If the pawl frame is over-rotated 54, the finger 38 will drag along the teeth during outward pivot of the wheel retention arm to release the bike. An over-rotation stop 42 prevents this by contacting the top of the ratchet bar 34, stopping the rotation 52 of the pawl frame 36 caused by a user lifting the lever 40. It can be stopped at the maximum distance of the finger 38 from the bottom of the ratchet bar.

Unlike a conventional ratchet, the pawl teeth 35 may be shallow and symmetric, and may be produced by a series of side mill cuts, where each milling produces a cylindrical concavity as little as 0.010 inch (0.25 mm) deep. This is because the pawl design as shown works even with a toothless ratchet bar and finger of aluminum, but providing shallow teeth/valleys as shown improves the grip of the pawl finger 38 on the ratchet bar 34.

Figure 8:
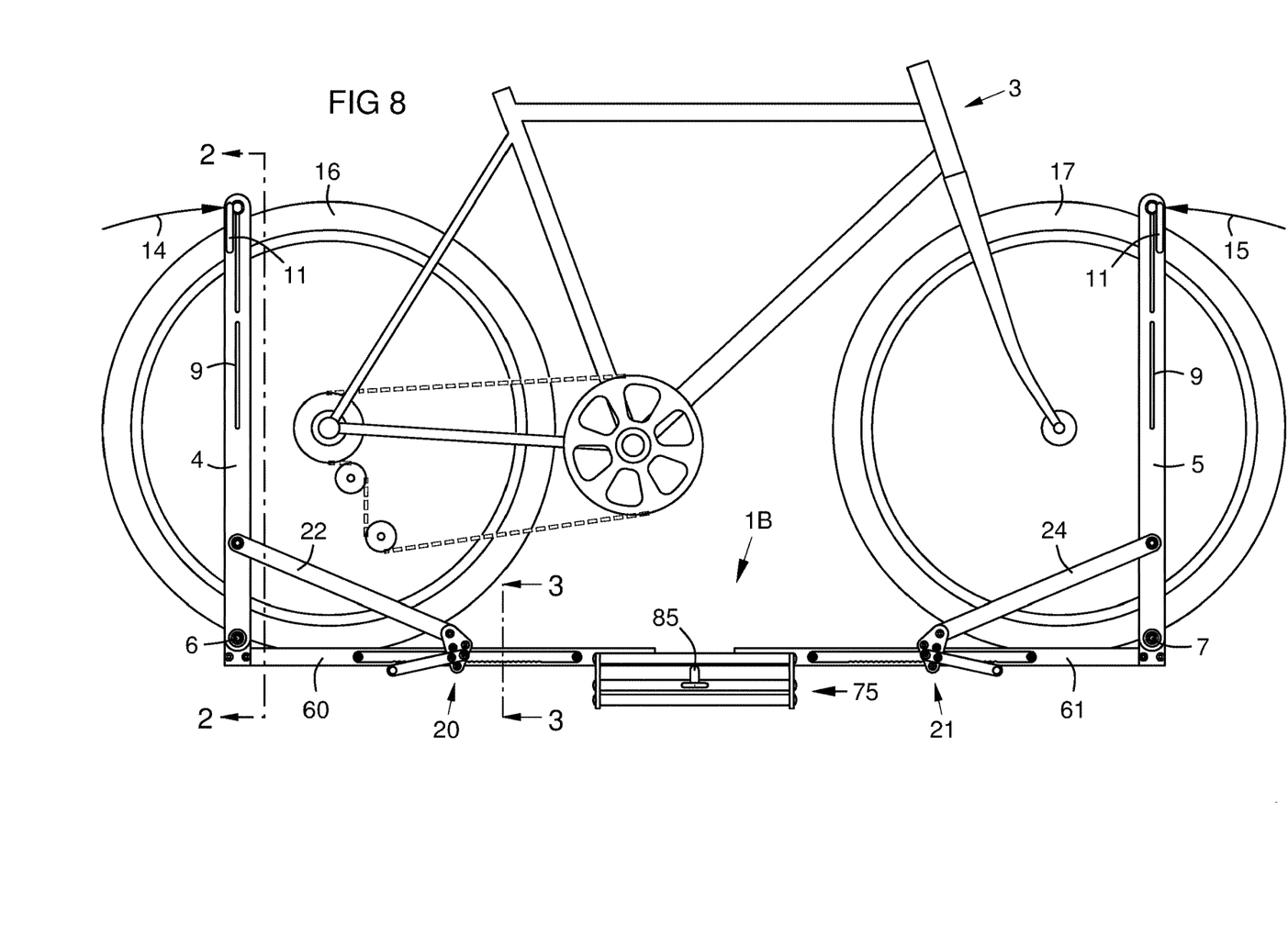
FIG. 8 is a back view of a bike carrier for a trailer hitch receiver according to aspects of the invention.

FIG. 8 is a back view of a bike carrier 1B for a trailer hitch receiver according to aspects of the invention. A bike 3 is mounted on the carrier by placing its wheels 16, 17 in respective wheel trays 60, 61. These trays may be extrusions such as U-channel or V-channel that are convex upward to retain the wheels and lock the steering of the bike. This bike carrier has the same elements and operation as the roof rack carrier described above, but includes additional elements related to mounting the carrier to the receiver hitch of a vehicle. It may provide a separate tray 60, 61 for each wheel enabling the trays to be folded together over the drawbar assembly for compact shipping and storage.

Figure 9:
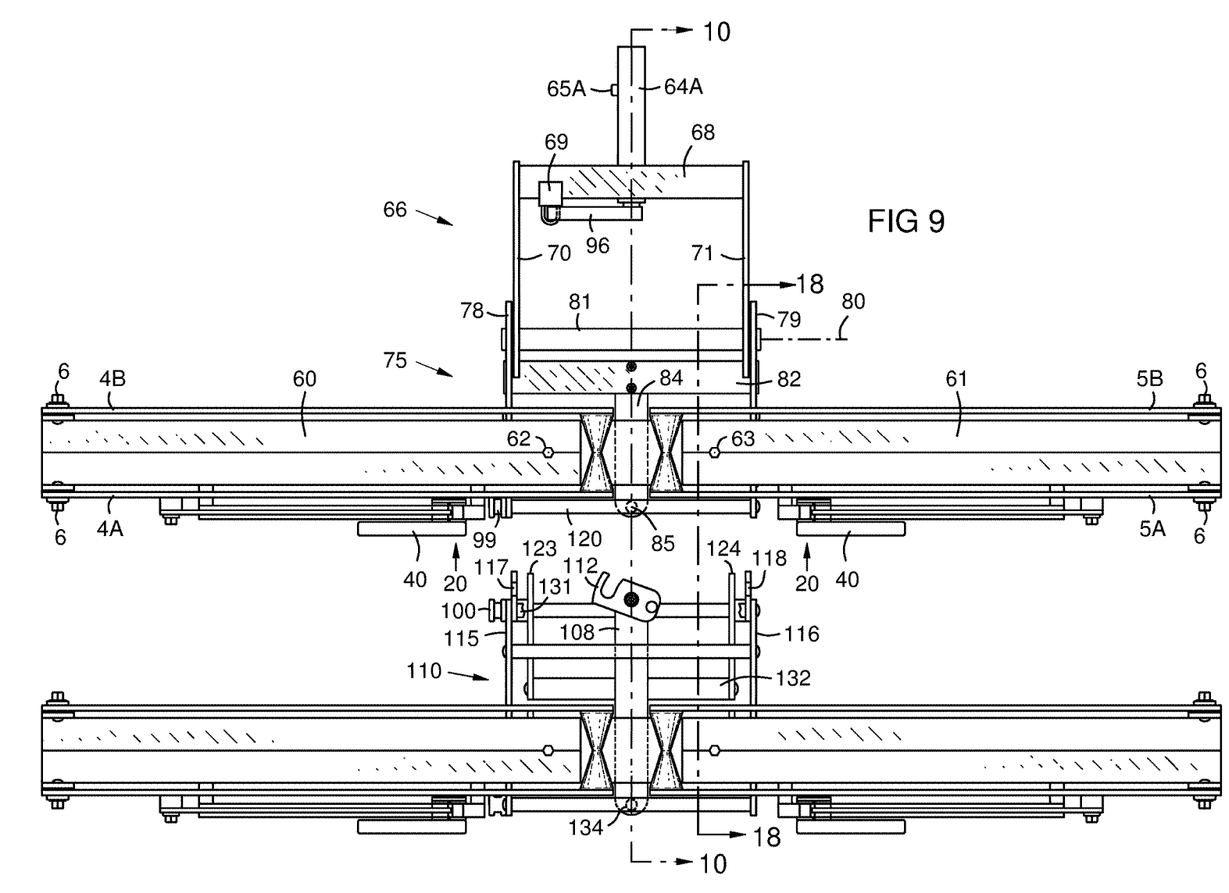
FIG. 9 is a top view of the bike carrier of FIG. 8 with the wheel retainer arms folded down to the wheel trays.

FIG. 9 is a top view of the bike carrier of FIG. 8 with the wheel retainer arms 4A, 4B and 5A, 5B folded down to the wheel trays 60, 61. A trailer hitch drawbar 64A is attached to the trays via a drawbar assembly 66 comprising a horizontal cross bar 68 attached to the drawbar, and left and right vertically oriented pivot plates 70, 71 attached to the cross bar. The drawbar has a spring-loaded push button 65A that locks the drawbar in the hitch receiver. It has a mechanism operated by a lever 96 as later described for tightening the drawbar in the receiver. A padlock 69 pay secure the drawbar in the receiver. A main tray assembly 75 comprises left and right tray assembly plates 78, 79 attached to the drawbar assembly on a horizontal pivot axis 80, allowing the trays 60, 61 to pivot upward about the axis 80 to a compact upward position behind the motor vehicle. The pivot axis may be implemented by a pivot axle journaled in a pivot cross member 81 between the pivot plates 70, 71 that serves as a structural member of the drawbar assembly. The pivot position is locked with a pivot lock bar 82 operated by a trigger bar 84 via a manual trigger 85 at the back of the main tray assembly 75. The trays 60, 61 are mounted to the main tray assembly 75 by respective pivot attachments 62, 63, so they can pivot between the operational co-aligned laterally extending position shown and a compact parallel position over the drawbar assembly 66 for shipping and storage as later shown.

An add-on tray assembly 110 with left and right side plates 115, 116 is shown in position for coupling to the main tray assembly 75 to support a second bike on the carrier. An add-on trigger 134 is provided at the back of the add-on tray assembly for convenient control of the carrier pivot lock bar 82. The add-on trigger is linked to the pivot lock bar 82 via an add-on trigger bar 108 with a latch 112 that hooks over the main trigger 85, thus controlling the main trigger bar 84 as later described. Left and right upward facing slots 117, 118 receive an upper coupling bar 120 on the main tray assembly as later described. Left and right downward facing coupling hooks 123, 124 on the add-on assembly hook a lower coupling bar (not seen here) on the main tray assembly as later described.

First and second spools 99, 100 may extend laterally outward from the main tray assembly 75 and the add-on assembly respectively to retain the hasp of a lock in a waist of the spools, preventing unauthorized removal of the add-on tray assembly from the main tray assembly as later shown. The spools may be formed as washers or spacers for a machine screw that connects a horizontal coupling bar 120 of the main assembly 75 and a horizontal cross bar 131 of the add-on assembly to a respective side plate 78, 115. These may be upper or lower bars.

Figures 10, 11:
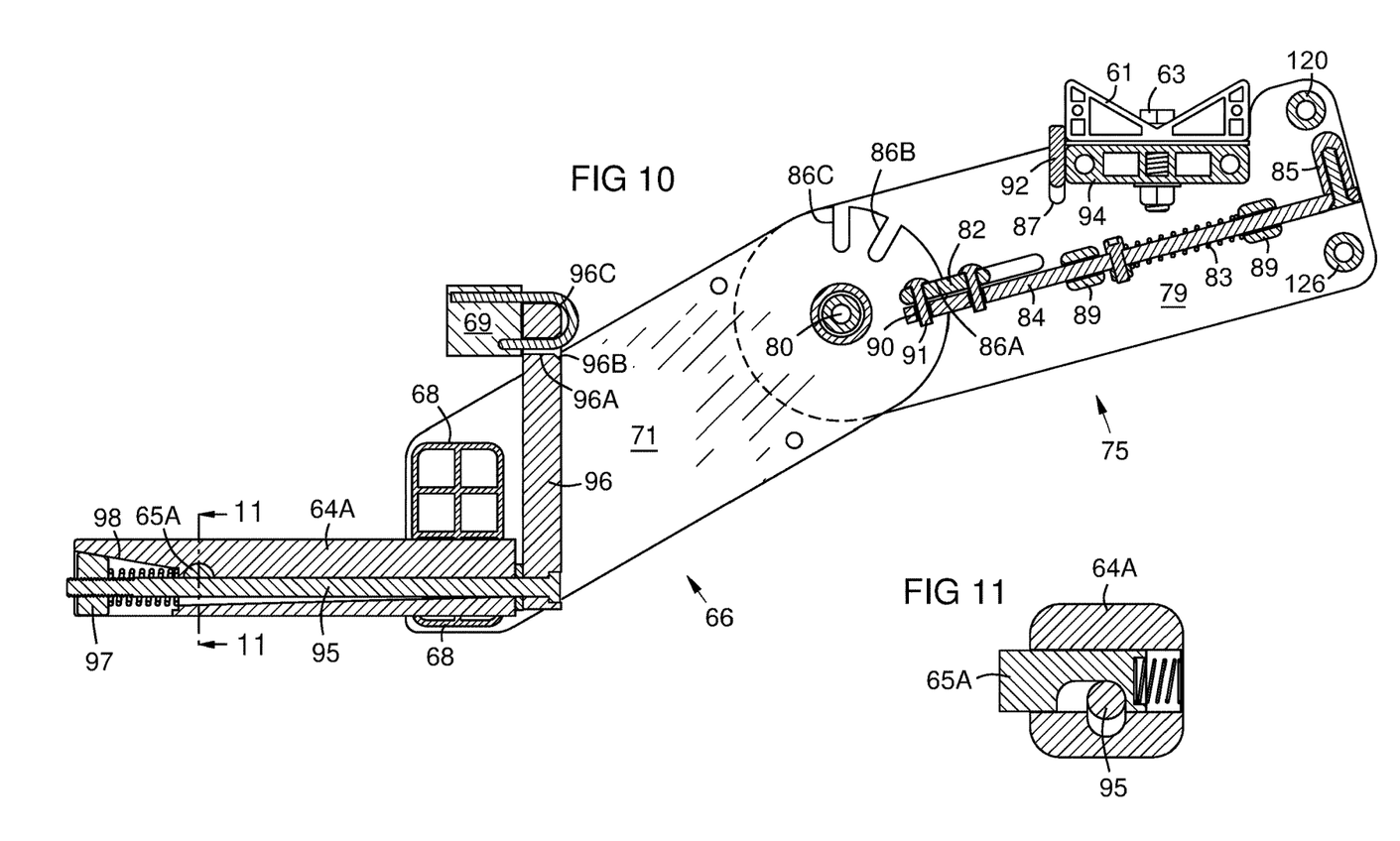
FIG. 10 is a side sectional view of the drawbar and a main tray assembly taken on line 10-10 of FIG. 9.
FIG. 11 is a sectional view taken on line 11-11 of FIG. 10.

FIG. 10 is a side sectional view of the drawbar 64A, drawbar assembly 66, and main tray assembly 75 taken on line 10-10 of FIG. 9. This drawbar embodiment 64A is suitable for a 1.25 inch hitch receiver for example. A cross bar 68 is attached to the drawbar, and a right pivot plate 71 is attached to the cross bar. The main tray assembly 75 is pivotally connected 80 to the drawbar assembly. The right pivot plate 71 and a mirror image left pivot plate (not shown here) provide a selection of pivot lock slots 86A-C. A pivot lock bar 82 is slidably mounted on the main tray assembly 75, and falls into a selected one of these slots under force of a spring 83. A trigger bar 84 extends from the lock bar to a trigger 85 at the back of the main tray assembly 75. Pulling the trigger releases the pivot bar 82 from the slot 86A. The trigger bar 84 is slidably mounted through trigger cross bars 89 in the main tray assembly 75. The trigger bar may have a floating connection 90 to the pivot lock bar. For example, clearance 90 may be provided in the trigger bar 84 around screws 91 that couple the trigger bar to the lock bar. The floating connection may allow at least 0.1 or 0.2 degrees of angular play between the pivot lock bar and the trigger bar in a longitudinal vertical plane. Such connection allows the lock bar 82 to slide easily into and out of the slots 86A-C without binding, despite minimal clearance between the lock bar and the slot. A tray lock bar 92 is slidably mounted in a vertical slot 87, and is spring loaded upward to a stopping point immediately beside the trays, as shown here by right tray 61. The tray lock bar is pushed down to release the trays so they can be rotated together over the drawbar assembly 66 via their pivot connections 63 to the main tray crossbar 94.

The drawbar 64A has a translation screw 95 operated by a lever 96 to move a follower 97A along a ramp 98 or angled slot to jam the front end of the drawbar upward against the inner surface of the hitch receiver (not shown), locking it therein. The front end of the drawbar is pushed in the same direction as the weight of the bike carrier pivots it within the receiver, so bouncing of the motor vehicle does not stress the follower or screw.

The lever 96 may be locked with a padlock 69 inserted through a hole 96A in the lever so that the case of the padlock extends over the crossbar 68. This blocks lever rotation by the case of the padlock hitting the crossbar, securing the drawbar to the receiver. The direction of lock insertion may be enforced by countersinking 96B the hole 96A only on the back end (right end in this view) and/or by filleting 96C the end of the lever on only the back edge. The hole 96A is spaced from end of the lever by an amount that barely allows the padlock to close when the case of the lock is forward as shown. The padlock cannot be closed in the other direction due to the curvature of the hasp interfering with the unchamfered front edge of the hole 96B and/or the un-filleted front edge of the end of the lever. This orientation of the lock prevents the lever from being moved past the crossbar by the top of the hasp fitting between them. FIG. 11 is a sectional view taken on line 11-11 of FIG. 10 showing the spring-loaded push button 65A in the drawbar 64A.

Figure 12:
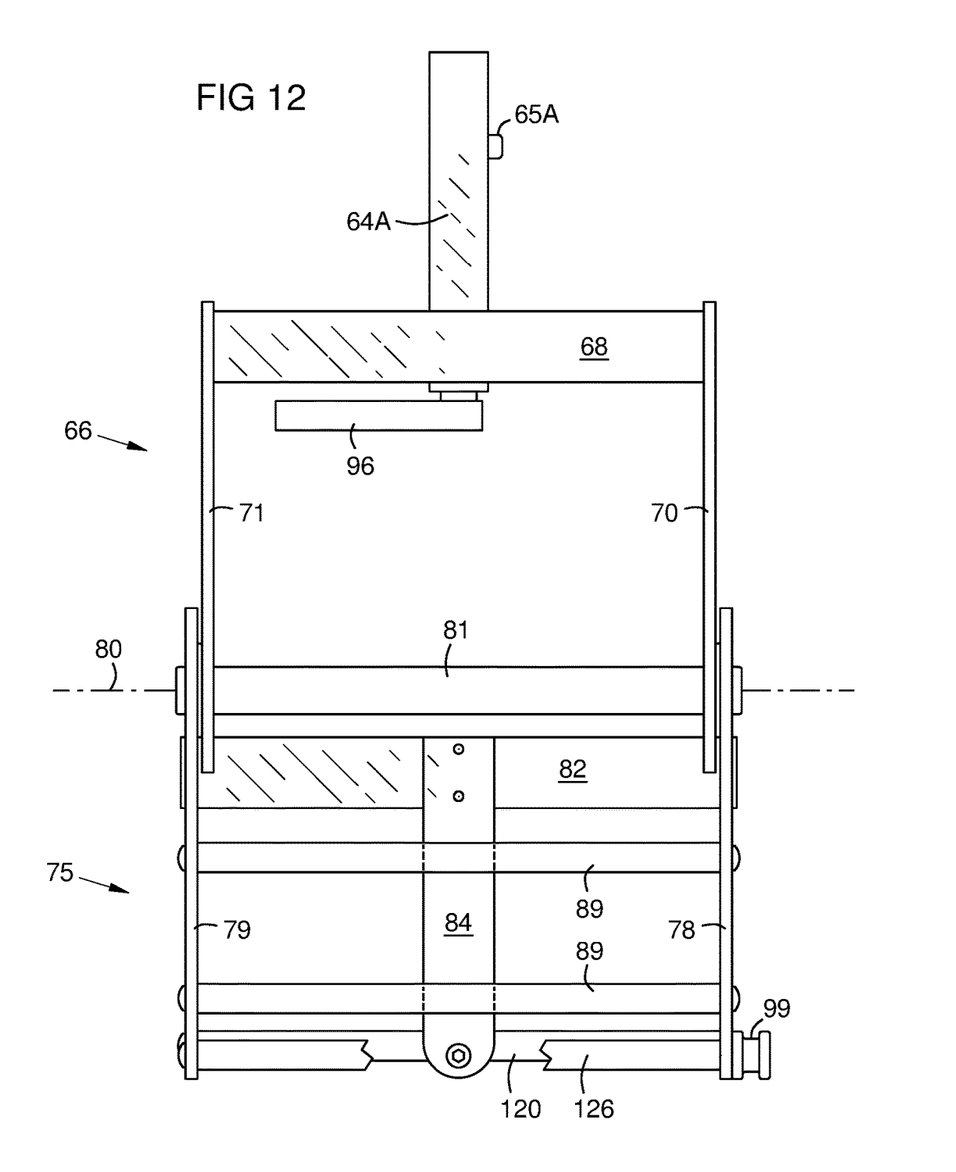
FIG. 12 is a bottom view of the drawbar and main tray assembly.

FIG. 12 is a bottom view of the drawbar 64A, drawbar assembly 66, and main tray assembly 75 as previously described. Upper and lower coupling bars 120, 126 are used as later describe to attach an add-on tray assembly to carry a second bike on the same carrier. The lower coupling bar 126 is cut away to more clearly see the end of the trigger bar 84. A nut 99 on a coupling bar 120 or 126 may be formed with a waist so as to hold the hasp of a padlock in conjunction with an adjacent nut on the add-on tray assembly to secure the add-on tray assembly to the main tray assembly 75 as later shown.

Figures 13, 14, 15, 16, 17:
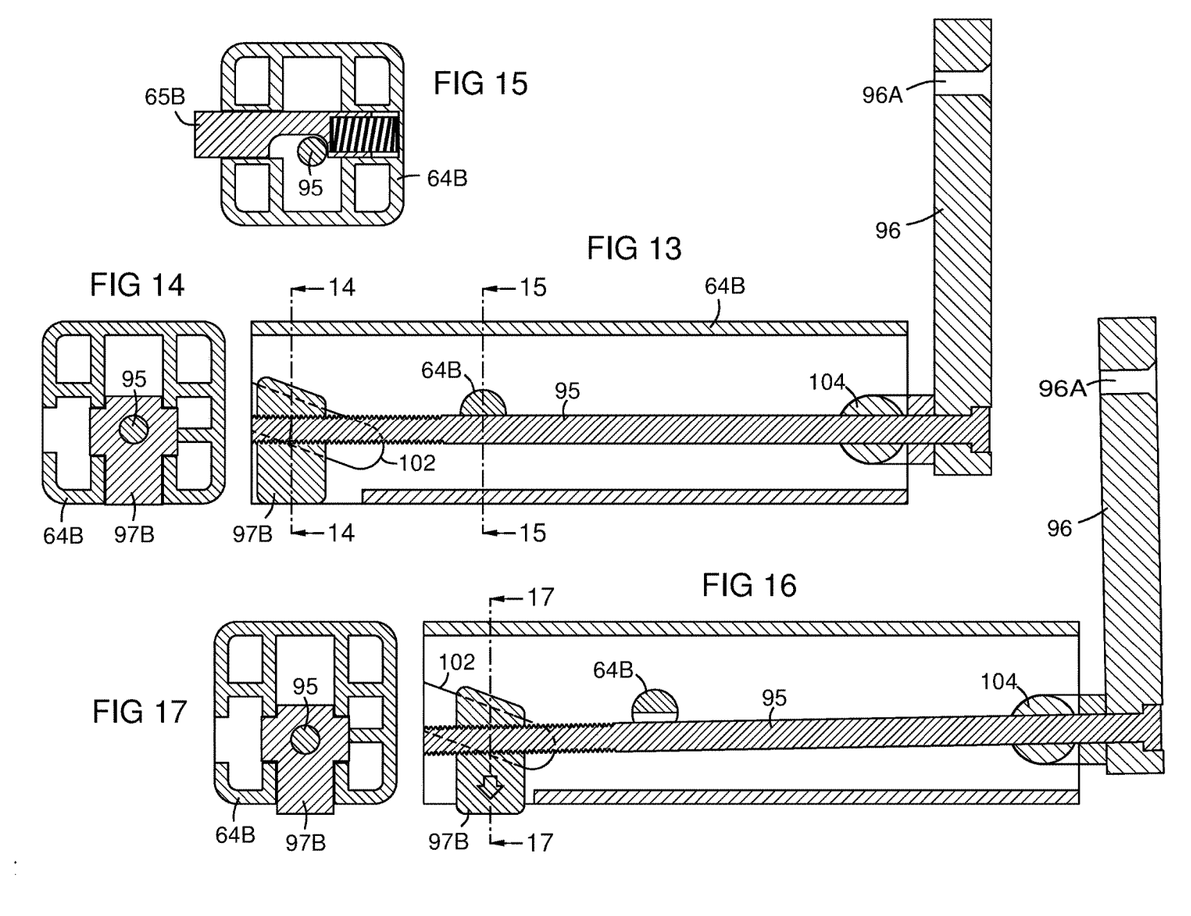
FIG. 13 is a side sectional view of a second drawbar embodiment in an insert/release position.
FIG. 14 is a sectional view taken on line 14-14 of FIG. 13.
FIG. 15 is a sectional view taken on line 15-15 of FIG. 13.
FIG. 16 is a side sectional view of the second drawbar embodiment in a tightened position.
FIG. 17 is a transverse sectional taken on line 17-17 of FIG. 16.

FIG. 13 is a side sectional view of a second drawbar embodiment 64B in an insert/release position. This embodiment is suitable for example for a 2-inch hitch receiver. FIG. 14 is a sectional view taken on line 14-14 of FIG. 13. A crank lever 96 turns a translation screw 95 to move a follower 97B along a ramp or angled slot 102 to extend the follower below the drawbar as shown in FIGS. 16 and 17, pushing the front end of the drawbar upward against the upper inner surface of the hitch receiver (not shown). The translation screw may be mounted through a pivot element 104 to accommodate the changing angle of the screw shaft. The crank lever may have a hole 96A for a lock hasp.

FIG. 15 is a sectional view taken on line 15-15 of FIG. 13, showing a push button 65B urged laterally outward from a side of the drawbar 64B. When the drawbar 64B is inserted into a hitch receiver, this button 65B falls into a hole in a side wall of the receiver that is conventionally available for a through-pin.

Figures 18, 19, 20:
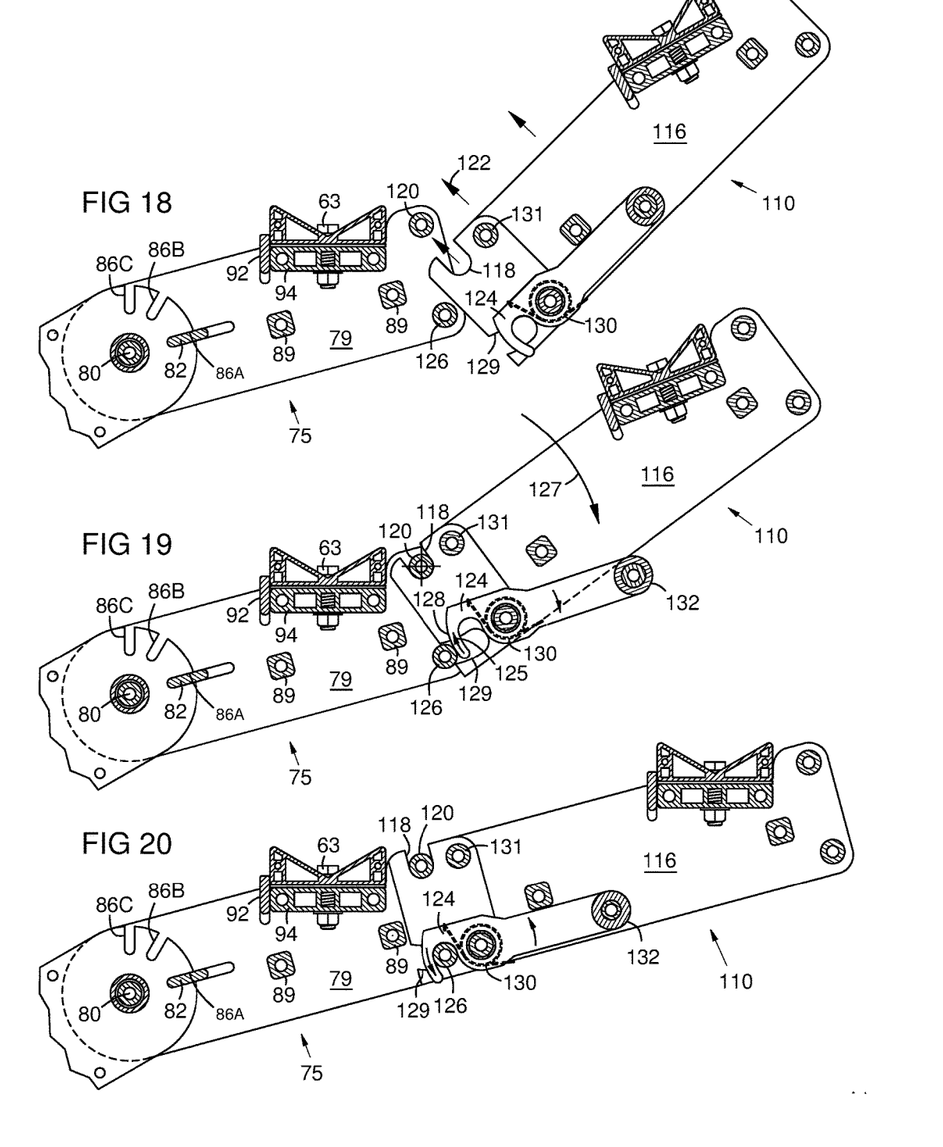
FIGS. 18-20 are a sequence of sectional views taken along line 18-18 of FIG. 9 showing the operation of coupling an add-on tray assembly to a main tray assembly.

FIGS. 18-20 are a sequence of sectional views taken along line 18-18 of FIG. 9 to illustrate the operation of mounting of an add-on tray assembly 110 to a main tray assembly 75. Upper and lower horizontal coupling bars 120, 126 are disposed at the back of the main tray assembly 75. The add-on tray assembly has mirror image left and right side plates—left 115 and right 116—the right plate 116 being shown here. Left and right upward facing coupling slots 118 are disposed at a top front part of the add-on assembly. Left and right downward facing pivoting coupling hooks 124 are disposed at a bottom front part of the add-on assembly. In FIG. 18 the add-on assembly is moved diagonally upward 122 as shown so that the upward facing coupling slots 118 slip over the upper coupling bar 120 of the main tray assembly 75.

FIG. 19 shows the add-on assembly being rotated downward 127 around the upper coupling bar 120 of the main tray assembly in the upward facing coupling slots 118 so that the coupling hooks 124 engage the lower horizontal coupling bar by climbing over it. At the same time, the lower coupling bar 126 slips into forward facing slots 129 in the forward bottom end of the add-on assembly. The coupling hook 124 has an upper surface 128 with a geometry that causes it to climb 125 over the lower coupling bar 126 when pressed against it during rotation 127 of the add-on assembly. This climbing overrides the force of a spring 130 until the hook falls over the lower coupling bar under the spring force. The add-on assembly is now firmly locked onto the main tray assembly, with no tools required. To release it, a handle 132 between respective backward extending levers of the left and right coupling hooks is pushed downward, and the motions of FIGS. 19 and 18 are reversed. The coupling and decoupling operations can be done quickly. FIG. 20 shows the resulting coupling of the add-on tray assembly to the main tray assembly. The coupling is positive and strong enough to withstand bouncing of the motor vehicle with bikes mounted on both assemblies 75, 110 and a further add-on assembly if needed.

Figures 21, 22:
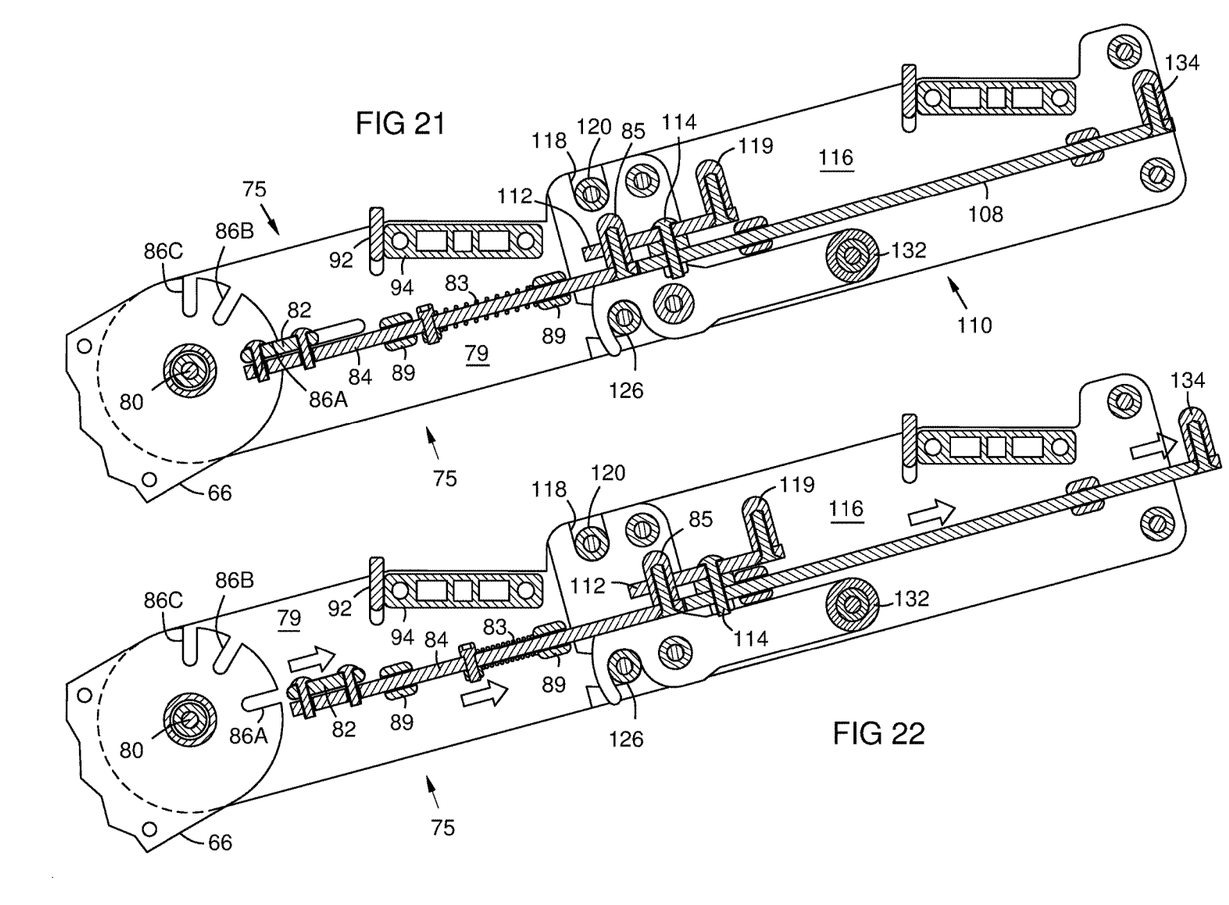
FIG. 21 is a sectional view of the add-on tray assembly coupled to the main tray assembly as viewed from line 10-10 of FIG. 9 after coupling.
FIG. 22 shows a view as in FIG. 21 with the add-on trigger being pulled back, releasing the pivot lock bar from the pivot slot via the main trigger and main trigger bar.

FIG. 21 is a side sectional view of the add-on tray assembly coupled to the main tray assembly as viewed from line 10-10 of FIG. 9 after coupling. This shows how the trigger bar 84 of the main tray assembly 75 is operated by an add-on trigger 134 at the back of the add-on tray assembly for convenience. A spring 83 urges the pivot lock bar into the slots 86A-C. Multiple add-on tray assemblies can be chained in sequence, each one interconnected to the trigger bar of the previous assembly. The add-on trigger bar 108 has a latch 112 mounted on a pivot attachment 114 and has a finger grip 119. This latch is seen from the top in FIG. 9. FIG. 22 shows a view as in FIG. 21 with the add-on trigger 134 being pulled back, releasing the pivot lock bar 82 from the pivot slot 86A via the main trigger 85.

Figure 23:
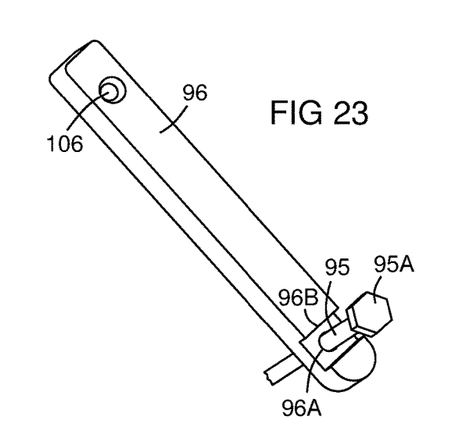
FIG. 23 is a perspective view of a translation screw with attached lever.

FIG. 23 is a perspective view of a translation screw 95 with attached lever 96. The translation screw may be a conventional bolt with a head 95A having external flats as shown. The lever 96 may be formed as a wrench, having a depression 96E with opposed internal flats matching and receiving the opposed external flats of the bolt head. A bolt hole 96D is in the bottom of the depression. The lever 96 slides over the bolt from the end opposite the head until the head bottoms in the depression, where it is bracketed by the internal flats. The lever 96 is retained on the bolt 95 by the bolt head, and will not come off without removing the bolt from the drawbar, which cannot be done if the drawbar is tight in the receiver and the lever is locked as previously described. This lever design enables use of a conventional bolt for the translation screw while providing an attached lever for turning the screw and security. The opposite end of the lever has a hole 106 for the hasp of a lock.

Figure 24:
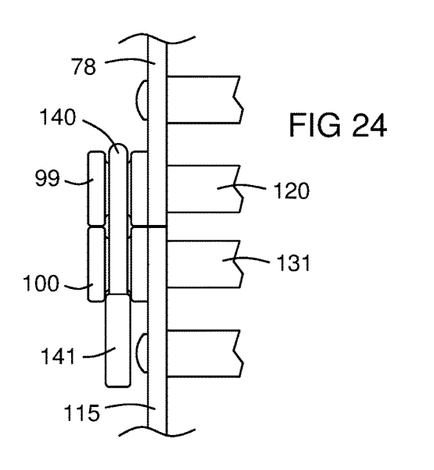
FIG. 24 is a partial top view of a side plate of the main tray assembly and a side plate of the add-on tray assembly locked together with a padlock.

FIG. 24 is a partial top view of a side plate 78 of the main tray assembly and a side plate 115 of the add-on tray assembly when the two assemblies are coupled. Two spools 99, 100 extend outward from these respective side plates, and are adjacent. A hasp 140 of a lock 141 fits in the waist of the spools, locking them together. The spools may be formed as nuts, washers, or spacers for a machine screw that connects a horizontal coupling bar 120 of the main assembly 75 and a horizontal cross bar 131 of the add-on assembly to a respective side plate 78, 115. These may be upper or lower coupling bars. Upper bars 120 and 131 are shown here.

Figure 25:
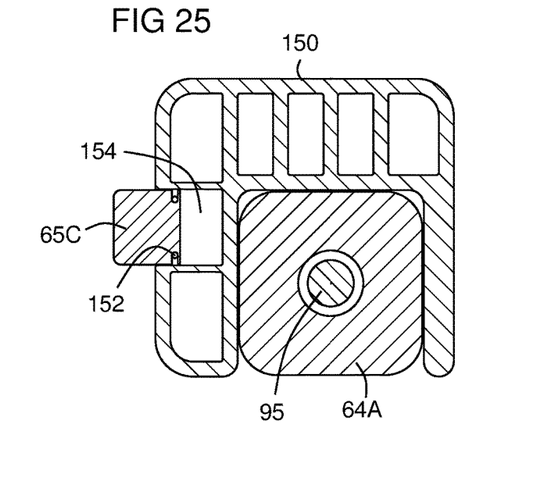
FIG. 25 is a sectional view of a 1.25 inch drawbar with a 2-inch drawbar adapter.

FIG. 25 is a transverse sectional view of a 1.25 inch drawbar 64A with a 2-inch drawbar adapter 150. The adapter may have an inverted U-shape in section as shown, and may be laterally asymmetric to provide space for a push button 65C. A spring 152 in the adapter for the button may be a round wire that loops around the back of the button in a groove therein as shown and extends forward or backward in an extruded chamber 154 of the drawbar, providing two parallel wires acting as both a leaf spring and a button retainer.

Figure 26:
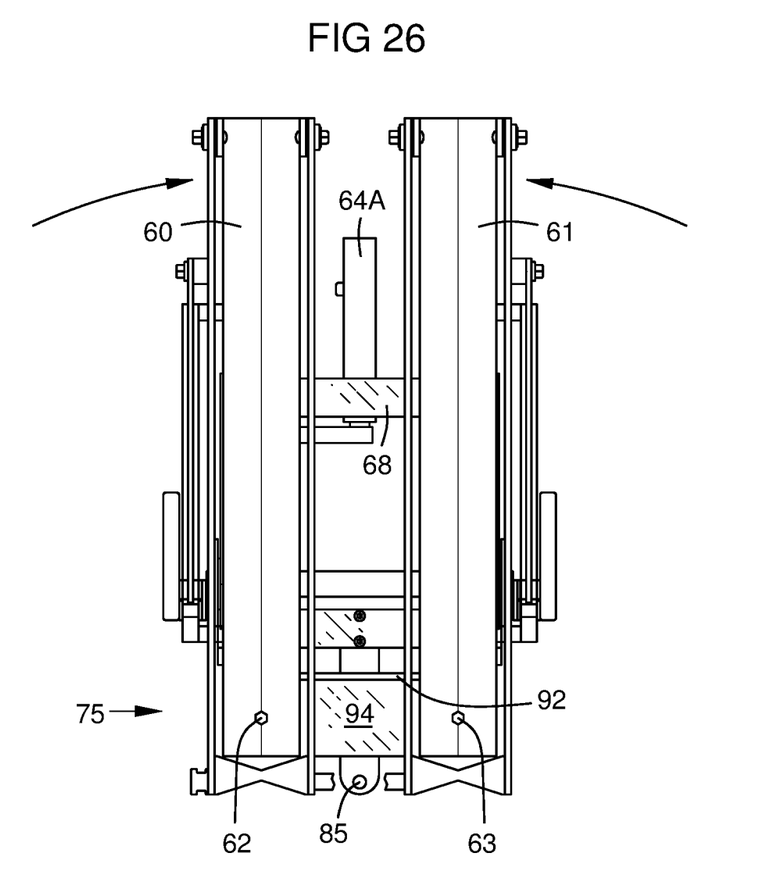
FIG. 26 is a top view of a main tray assembly with trays folded for shipping.

FIG. 26 is a top view of a main tray assembly with trays 60, 61 folded forward about their pivotal attachments 62, 63 for shipping. No assembly is required by the user on receipt. They just unfold the trays, which automatically lock in the open position via tray lock bar 92.

The drawbar designs 65A, 65B, and the drawbar adapter 150 may be used with other accessories attachment to a trailer hitch receiver besides bike carriers, such as a lawnmower carrier, spray equipment, a tailgate table set, or a barbeque grill as examples.

While various embodiments of the present invention have been shown and described herein, such embodiments are provided by way of example only. Numerous variations, changes and substitutions may be made without departing from the invention herein. Accordingly, it is intended that the invention be limited only by the spirit and scope of the appended claims.

The invention claimed is:

1. A bike carrier on a drawbar for a trailer hitch receiver, the bike carrier comprising:
   two trays for a respective two wheels of a bike, wherein the two trays pivot on a respective two pivot attachments between an operational co-aligned lateral position and a compact parallel forward position for shipping and storage;
   a tray lock bar mounted in the carrier and urged by a spring into a position that automatically releasably locks the trays in the operational position;
   a wheel retention arm on a distal end of each said tray; and
   a retention arm pivot ratchet between each wheel retention arm and the tray to which it is attached, wherein the pivot ratchet allows inward pivoting of the wheel retention arm, locks the retention arm against outward pivoting, is releasable to allow the retention arm to pivot outward to release the bike from the carrier, and comprises a pivot release over-rotation stop on a pawl of the ratchet that prevents over rotation and dragging of the pawl on a ratchet bar of the ratchet.

2. A bike carrier for a tubular trailer hitch receiver on a motor vehicle, the bike carrier comprising:
   a drawbar assembly comprising a drawbar for the tubular trailer hitch receiver;
   a bike carrying tray assembly mounted on the drawbar;
   first and second bike wheel carrying trays for holding respective first and second wheels of a bike;
   each bike wheel carrying tray pivotally mounted onto the bike carrying tray assembly for pivoting of said trays between a co-aligned laterally extending operational position and a forward position for compact shipping and storage; and
   a tray lock bar mounted in the bike carrying tray assembly and urged by a spring in the bike carrying tray assembly to a position that automatically releasably locks the bike wheel carrying trays in the operational position;
   wherein the tray lock bar is slidably mounted in a tray lock bar slot in the bike carrying tray assembly for vertical motion therein, and is urged upward by the spring to a stopping point immediately beside the bike wheel carrying trays in the operational position thereof, and can be pushed downward by a user to release the bike wheel carrying trays to pivot into the forward position.

3. A bike carrier for a tubular trailer hitch receiver on a motor vehicle, the bike carrier comprising:
   a drawbar assembly comprising a drawbar for the tubular trailer hitch receiver;
   a bike carrying tray assembly mounted on the drawbar;
   first and second bike wheel carrying trays for holding respective first and second wheels of a bike;
   each bike wheel carrying tray pivotally mounted onto the bike carrying tray assembly for pivoting of said trays between a co-aligned laterally extending operational position and a forward position for compact shipping and storage;
   a tray lock bar mounted in the bike carrying tray assembly and urged by a spring in the bike carrying tray assembly to a position that automatically releasably locks the bike wheel carrying trays in the operational position; and an H-shaped or inverted U-shaped wheel retention arm pivotally attached to a distal end of each of the trays, each wheel retention arm comprising two parallel side arms and a cross member between them;

wherein the cross member of each wheel retention arm is mounted between respective opposed elongated slots in the parallel side arms at a selectable position along a length of the parallel side arms by a releasable mechanism that allows the cross member to move along the elongated slots to adjust for different diameters of wheels on a range of bikes.

4. The bike carrier of claim 3, wherein each cross member comprises:
   a separator that holds the parallel side arms apart, the separator comprising a waist that contacts a tire of the two wheeled vehicle; and
   a shaft through the separator and through the elongated slots in the parallel arms;
   wherein the releasable mechanism comprises a tool-less tensioner on an end of the shaft that tensions and loosens the shaft, fixing the cross member to, and releasing it from, the selectable position on the parallel side arms.

5. The bike carrier of claim 4, wherein the releasable mechanism comprises a quick-release cam lever.

* * * * *